United States Patent
Udagawa

[11] Patent Number: 5,842,702
[45] Date of Patent: Dec. 1, 1998

[54] METAL LAMINATE TYPE CYLINDER HEAD GASKET WITH HEAT PREVENTING PORTION

[75] Inventor: Tsunekazu Udagawa, Ichikawa, Japan

[73] Assignee: Ishikawa Gasket Co., Ltd., Tokyo, Japan

[21] Appl. No.: 347,087

[22] Filed: Nov. 23, 1994

[51] Int. Cl.⁶ .................................................. F16J 15/08
[52] U.S. Cl. ........................... 277/593; 277/595; 277/597
[58] Field of Search ............................... 277/235 B, 236, 277/234, 207 R, 26, 593, 595, 597

[56] References Cited

U.S. PATENT DOCUMENTS

| | | | |
|---|---|---|---|
| 1,812,578 | 6/1931 | Bailey | 277/235 B |
| 3,352,564 | 11/1967 | Johnson | 277/235 B |
| 3,567,234 | 3/1971 | Skrycki | 277/235 B |
| 4,834,399 | 5/1989 | Udagawa et al. | 277/234 |
| 5,092,613 | 3/1992 | Udagawa | 277/236 |
| 5,240,261 | 8/1993 | Udagawa et al. | 277/236 |
| 5,255,926 | 10/1993 | Udagawa | 277/236 |

FOREIGN PATENT DOCUMENTS

| | | | |
|---|---|---|---|
| 440831 | 8/1991 | European Pat. Off. | 277/235 B |
| 468654 | 1/1992 | European Pat. Off. | 277/235 B |

*Primary Examiner*—Daniel G. DePumpo
*Attorney, Agent, or Firm*—Kanesaka & Takeuchi

[57] ABSTRACT

A metal laminate type cylinder head gasket of the invention is basically formed of first and second metal plates laminated together. The first metal plate includes a heat preventing portion for defining a first hole for a cylinder bore, a main sealing portion situated around the heat preventing portion, and a base portion. The heat preventing portion shuts off heat from the cylinder bore thereat, and the main sealing portion forms a solid portion for sealing around the first hole. The base portion extends from the main sealing portion to substantially cover the entire area of the engine. The second metal plate includes a second hole with a diameter greater than a diameter of the main sealing portion, and is situated adjacent to the base portion of the first metal plate. The second metal plate is not substantially affected by heat in the cylinder bore.

10 Claims, 1 Drawing Sheet

5,842,702

METAL LAMINATE TYPE CYLINDER HEAD GASKET WITH HEAT PREVENTING PORTION

BACKGROUND OF THE INVENTION AND RELATED ART STATEMENT

The present invention relates to a metal laminate type cylinder head gasket having a portion for preventing or reducing heat from a cylinder bore of the engine. Also, deformation of a cylinder block around the cylinder bore is reduced.

An automobile engine has been developed to provide high power and light weight. For this purpose, a cylinder head is made of an aluminum alloy, and in some cases, a cylinder block is also made of an aluminum alloy. In case the cylinder block is made of an aluminum alloy, rigidity of the aluminum alloy is not strong. Thus, if high sealing pressure is applied around the cylinder bore by a gasket, the cylinder block may deform.

Further, when the engine is operated, combustion temperature in the cylinder bore become very high. Thus, the gasket situated between the cylinder head and the cylinder block must withstand the high temperature. Also, a seal coating is effective for sealing between the plates of the gasket or between the gasket and the cylinder block or cylinder head. However, in case temperature in the cylinder bore is very high, creep relaxation of the seal coating may occur due to high temperature. Thus, the seal coating is not used for a gasket installed in a high temperature engine.

When the engine is operated, further, the gasket is also exposed to flame in combustion of fuel. Since the portion of the gasket exposed to flame is oxidized, the portion becomes weak or fragile. Thus, if the portion exposed to flame is bent, such portion may have a crack when used for a long time.

In U.S. Pat. No. 5,240,261, a gasket includes a solid portion around a cylinder bore, so that high surface pressure is not concentrated or formed around the cylinder bore to prevent deformation around the cylinder bore. Also, the solid portion reduces heat transmission from the cylinder bore. However, in case a seal coating which is not strong against heat is used for a gasket, the solid portion is not sufficient to reduce heat applied to the gasket. Further, since the solid portion is formed immediately outside the cylinder bore, the portion around the cylinder bore may still be deformed.

Accordingly, one object of the invention is to provide a metal laminate gasket, which can effectively reduce influence of heat in a cylinder bore.

Another object of the invention is to provide a metal laminate gasket as stated above, wherein flame in combustion of fuel in a cylinder bore is shut off.

A further object of the invention is to provide a metal laminate gasket as stated above, wherein deformation of a cylinder block around a cylinder bore is effectively reduced.

A still further object of the invention is to provide a metal laminate gasket as stated above, wherein a gasket is formed as thin as possible.

Further objects and advantages of the invention will be apparent from the following description of the invention.

SUMMARY OF THE DESCRIPTION

A metal laminate type cylinder head gasket of the invention is installed in an internal combustion engine. The gasket is basically formed of first and second metal plates laminated together.

The first metal plate includes a heat preventing portion, a main sealing portion and a base portion integrally formed in one plate. The heat preventing portion defines a first hole corresponding to a cylinder bore of the engine to shut off heat from the cylinder bore thereat. The main sealing portion is situated around the heat preventing portion and forms a solid portion for securely sealing around the first hole by compression. The base portion extends from the main sealing portion and substantially covers the entire area of the engine. The solid portion does not substantially provide elasticity.

The second metal plate includes a second hole with the diameter greater than the diameter of the main sealing portion and is situated adjacent to the base portion of the first metal plate. Since the second metal plate is located radially outside the heat preventing portion and the main sealing portion, the second metal plate is not exposed to high temperature or substantially affected by heat in the cylinder bore.

In case the second metal plate includes a seal coating, which is effective for sealing but weak to heat, the gasket of the invention is useful. Also, the second metal plate need not be strong against heat.

The main sealing portion is formed of at least three annular portions laminated together without space. The main sealing portion is formed by bending the first metal plate to constitute the solid portion.

The heat preventing portion is directly connected to an upper annular portion of the main sealing portion and includes a height substantially corresponding to the thickness of the main sealing portion. Preferably, the heat preventing portion includes a curved portion and a flange situated at a side opposite to the upper annular portion. The heat preventing portion may have resiliency to auxiliary seal around the cylinder bore.

When the gasket is situated between a cylinder head and a cylinder block and is tightened, the heat preventing portion shuts off flame in combustion of fuel in the cylinder bore and reduces heat transfer from the cylinder bore, while the main sealing portion is strongly compressed without resiliency to seal around the cylinder bore. Thus, the cylinder bore is securely sealed.

In regard to the second metal plate, the heat preventing portion and the main sealing portion prevent heat from the cylinder bore. Thus, the second plate is not exposed to high temperature.

Further, since the main sealing portion is located slightly away from the cylinder bore, when the gasket is tightened, high sealing pressure is not formed near the cylinder bore. Thus, deformation of the cylinder bore is prevented.

DETAILED DESCRIPTION OF THE PREFERRED EMBODIMENTS

Figure 1:
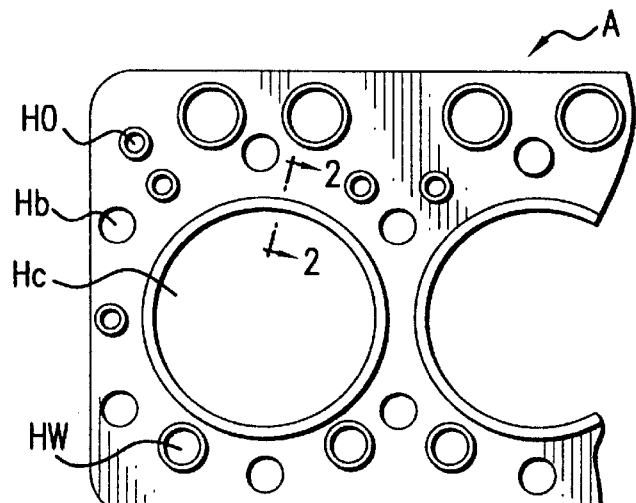
FIG. 1 is a plan view of a part of a first embodiment of a cylinder head gasket of the invention.
Figure 2:
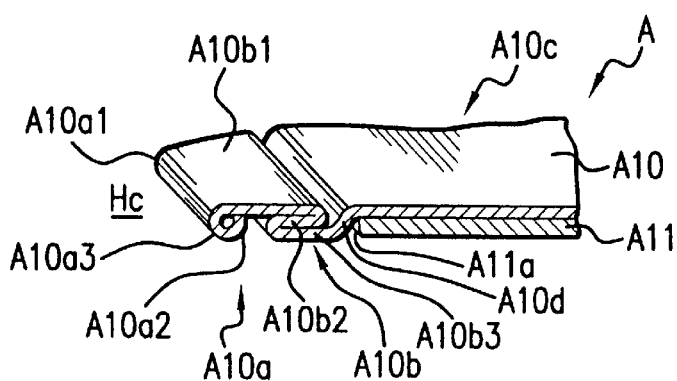
FIG. 2 is an enlarged section view taken along a line 2—2 in FIG. 1.

Referring to FIGS. 1 and 2, a first embodiment A of a cylinder head gasket of the invention is shown. The gasket A includes a plurality of cylinder bores Hc, water holes Hw, oil holes Ho and bolt holes Hb, as in the conventional gasket.

The present invention is directed to the sealing structure around the cylinder bore Hc. Therefore, sealing mechanisms for other holes are not explained. Any sealing mechanisms may be used for other holes.

As shown in FIG. 2, the gasket A is formed of a first or an upper plate A10, and a second or lower plate A11, which extend substantially throughout the entire area of the engine (not shown) to be sealed. The first plate A10 includes a heat preventing portion A10a situated around the cylinder bore Hc, a main sealing portion A10b situated around the heat preventing portion A10a, and a base portion A10c situated outside the main sealing portion A10b.

The heat preventing portion A10a includes a curved portion A10a1 to define the cylinder bore Hc, and a flange A10a2 extending from the curved portion A10a1. The flange A10a2 is bent at a rear end to abut against a portion for forming an upper annular portion A10b1 for the main sealing portion A10b. A space A10a3 is formed between the curved portion A10a1 and the rear end of the flange A10a2.

The main sealing portion A10b is formed of the upper annular potion A10b1, a middle annular portion A10b2 and a lower annular portion A10b3, which are laminated together. The main sealing portion A10b constitutes a solid portion, which is compressed when the gasket A is tightened.

An inclined portion A10d is formed between the lower annular portion A10b3 and the base portion A10c. The height of the inclined portion A10d, i.e. between the upper surface of the base portion A10c and the lower surface of the lower annular portion A10b3, is substantially the same as the thickness of the main sealing portion A10b. However, the height of the inclined portion A10d may be slightly greater than the thickness of the main sealing portion A10b to provide resilient surface pressure thereat when the gasket A is compressed.

The second plate A11 includes a hole A11a larger than the diameter of the inclined portion A10d. When the plates A10, A11 are assembled, the inclined portion A10d is located inside the hole A11a. The thickness of the second plate A11 is greater than that of the first plate A10. Namely the thickness of the first and second plates A10, A11 is substantially the same as that of the main sealing portion A10b.

When the gasket A thus prepared is situated between a cylinder head and a cylinder block (both not shown) and is tightened, the heat preventing portion A10a is slightly compressed, while the main sealing portion is not substantially compressed though providing high surface pressure thereat.

The heat preventing portion A10a prevents or shuts off heat at the cylinder bore Hc and resiliently seals around the cylinder bore Hc. The main sealing portion A10b provides high surface pressure to securely seal around the cylinder bore Hc. High heat in the cylinder bore Hc is shut off by the heat preventing portion A10a and the main sealing portion, so that the second plate A11 is not exposed to the high temperature.

Figure 3:
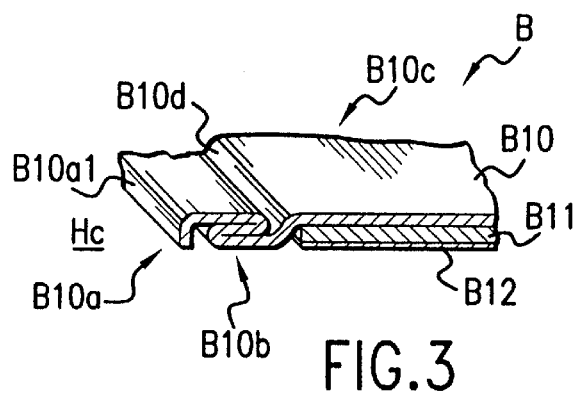
FIG. 3 is a section view, similar to FIG. 2, to show a second embodiment of a cylinder head gasket of the invention.

FIG. 3 shows a second embodiment B of a cylinder head gasket of the invention. The gasket B is formed of a first plate B10, and a second plate B11, wherein the first plate B10 includes a heat preventing portion B10a, a main sealing portion B10b, a base portion B10c and an inclined portion B10d, as in the gasket A.

However, in the gasket B, the heat preventing portion B10a includes a vertical portion B10a1 having a height substantially the same as or slightly greater than the thickness of the main sealing portion B10b. The vertical height of the inclined portion B10d is also slightly greater than the thickness of the main sealing portion B10b. Further, a seal coating B12 which is weak against heat but effective for sealing is formed on the second plate B11.

When the gasket B is tightened, the heat preventing portion B10a is compressed to shut off heat thereat, while the main sealing portion B10b securely seals around the cylinder bore Hc. Also, the inclined portion B10d provides resilient sealing pressure thereat. The seal coating B12 is protected from heat by the heat preventing portion and the main sealing portion. The gasket B operates as in the gasket A.

Figure 4:
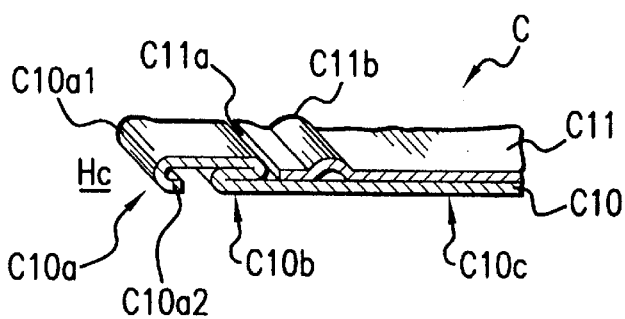
FIG. 4 is a section view, similar to FIG. 2, to show a third embodiment of a cylinder head gasket of the invention.

FIG. 4 shows a third embodiment C of a cylinder head gasket of the invention. The gasket C is formed of a first plate C10, and a second plate C11, wherein the first plate C10 includes a heat preventing portion C10a, a main sealing portion C10b and a base portion C10c, as in the gasket A.

In the gasket C, however, there is no inclined portion between the main sealing portion C10b and the base portion C10c, and the second plate C11 having a bead C11b around a hole C11a is located on the base portion C10c. Since the second plate C11 includes the bead C11b to provide sealing pressure, the thickness of the second plate C11 is the same as that of the first plate C10. The heat preventing portion C10a includes a curved portion C10a1 and a flange C10a2.

When the gasket C is tightened, the heat preventing portion C10a is compressed to resiliently seal around the cylinder bore and shut off heat thereat, while the main sealing portion C10b securely seals around the cylinder bore Hc. The bead C11b resiliently seals around the main sealing portion C10b. The gasket C operates as in the gasket A.

In the gasket of the invention, heat and pressure in the cylinder bore is shut off by the heat preventing portion and the main sealing portion formed in the first plate. Thus, the second plate can be made of a material not so strong against heat, or include a seal coating not so strong against heat.

While the invention has been explained with reference to the specific embodiments of the invention, the explanation is illustrative and the invention is limited only by the appended claims.

What is claimed is:

1. A metal laminate type cylinder head gasket adapted to be installed in an internal combustion engine having a cylinder bore therein, comprising, a first metal plate including a first hole corresponding to the cylinder bore of the engine, a heat preventing portion for defining the first hole to shut off heat from the cylinder bore thereat and being formed at an inner end portion of the first plate, a main sealing portion situated around the heat preventing portion and forming a solid portion to be compressed strongly for sealing around the first hole, said main sealing portion being formed of at least three annular portions including lower and upper annular portions and laminated together by bending the first metal plate outside the inner end portion without elasticity, and a base portion extending from the main sealing portion to substantially cover an entire area of the engine, and a second metal plate having a second hole with a diameter greater than a diameter of the main sealing portion and situated adjacent to the base portion of the first metal plate so that the second metal plate is not substantially affected by heat in the cylinder bore.

2. A metal laminate type cylinder head gasket according to claim 1, wherein said first metal plate includes an inclined portion between the lower annular portion of the main sealing portion and the base portion, said second metal plate being located outside the inclined portion relative to the cylinder bore.

3. A metal laminate type cylinder head gasket according to claim 1, wherein said second metal plate includes a bead around the second hole to resiliently seal around the cylinder bore.

4. A metal laminate type cylinder head gasket according to claim 2, wherein said second metal plate includes a coating thereon.

5. A metal laminate type cylinder head gasket according to claim 1, wherein said heat preventing portion, main sealing portion and base portion are formed integrally and only in the first metal plate.

6. A metal laminate type cylinder head gasket according to claim 5, wherein said gasket is formed of only the first and second metal plates as metal plates.

7. A metal laminate type cylinder head gasket adapted to be installed in an internal combustion engine having a cylinder bore therein, comprising, a first metal plate including a first hole corresponding to the cylinder bore of the engine; a heat preventing portion for defining the first hole to shut off heat from the cylinder bore thereat and being formed at an inner end portion of the first plate; a main sealing portion situated around the heat preventing portion and forming a solid portion to be compressed strongly for sealing around the first hole, said main sealing portion having a thickness substantially corresponding to a height of the heat preventing portion and being formed of at least three annular portions including lower and upper annular portions and laminated together by bending the first metal plate outside the inner end portion without elasticity, said heat preventing portion being directly connected to the upper annular portion; a base portion extending outside the main sealing portion to substantially cover an entire area of the engine; and an inclined portion between the lower annular portion and the base portion, and a second metal plate having a second hole with a diameter greater than a diameter of the main sealing portion and situated adjacent to the base portion of the first metal plate outside the inclined portion relative to the cylinder bore so that the second metal plate is not substantially affected by heat in the cylinder bore.

8. A metal laminate type cylinder head gasket according to claim 7, wherein said heat preventing portion has resiliency to seal around the cylinder bore.

9. A metal laminate type cylinder head gasket according to claim 8, wherein said heat preventing portion includes a curved portion extending to the upper annular portion at one end, and a flange extending from the other end of the curved portion.

10. A metal laminate type cylinder head gasket according to claim 9, wherein said flange includes a rear portion abutting against a portion between the upper annular portion and the curved portion to form a space of the first metal plate between the curved portion and the rear portion.

\* \* \* \* \*